(12) United States Patent
Morita et al.

(10) Patent No.: US 12,024,111 B2
(45) Date of Patent: Jul. 2, 2024

(54) AIRBAG DEVICE FOR DRIVER'S SEAT

(71) Applicant: Autoliv Development AB, Vargarda (SE)

(72) Inventors: Kazuki Morita, Kanagawa (JP); Kazuhiro Abe, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 92 days.

(21) Appl. No.: 17/310,632

(22) PCT Filed: Feb. 7, 2020

(86) PCT No.: PCT/JP2020/004892
§ 371 (c)(1),
(2) Date: Aug. 13, 2021

(87) PCT Pub. No.: WO2020/170864
PCT Pub. Date: Aug. 27, 2020

(65) Prior Publication Data
US 2022/0144201 A1 May 12, 2022

(30) Foreign Application Priority Data
Feb. 19, 2019 (JP) .................. 2019-027905

(51) Int. Cl.
*B60R 21/239* (2006.01)
*B60R 21/203* (2006.01)
(Continued)

(52) U.S. Cl.
CPC ........ *B60R 21/2035* (2013.01); *B60R 21/203* (2013.01); *B60R 21/215* (2013.01);
(Continued)

(58) Field of Classification Search
CPC . B60R 21/239; B60R 21/203; B60R 21/2035; B60R 21/215; B60R 21/231;
(Continued)

(56) References Cited

U.S. PATENT DOCUMENTS

| | | |
|---|---|---|
| 5,730,460 A | 3/1998 | Niederman |
| 6,554,313 B2 * | 4/2003 | Uchida ................. B60R 21/233 |
| | | 280/739 |

(Continued)

FOREIGN PATENT DOCUMENTS

| | | | | |
|---|---|---|---|---|
| DE | 102013011579 A1 * | 1/2015 | ....... | B60R 21/21656 |
| JP | 6-312641 | * | 11/1994 | |

(Continued)

*Primary Examiner* — Keith J Frisby
(74) *Attorney, Agent, or Firm* — Foley & Lardner LLP

(57) ABSTRACT

A driver seat airbag apparatus includes a steering wheel and an airbag module. The steering wheel has a central hub and a rim. The rim has a shape in which a portion of the upper portion of the rim is omitted. The hub includes: a module housing part which houses the airbag module; and a cover which covers the module housing and is cleavable at the expansion pressure of the cushion. The cover includes cover doors which open at the expansion pressure of the cushion. When the cover is cleaved, the cover doors are open in the right and left diagonal upward directions when viewed from the center of the hub, while a space portion without the cover doors is formed in the direction directly above the center of the hub when viewed from the center of the hub.

8 Claims, 8 Drawing Sheets

(51) Int. Cl.
*B60R 21/215* (2011.01)
*B60R 21/2165* (2011.01)
*B60R 21/231* (2011.01)

(52) U.S. Cl.
CPC ...... *B60R 21/21656* (2013.01); *B60R 21/231* (2013.01); *B60R 21/239* (2013.01); *B60R 2021/21537* (2013.01); *B60R 2021/21543* (2013.01)

(58) Field of Classification Search
CPC .......... B60R 21/21656; B60R 21/2165; B60R 2021/21537; B60R 2021/21543
See application file for complete search history.

(56) References Cited

U.S. PATENT DOCUMENTS

2006/0249932 A1* 11/2006 Marriott ................ B60R 21/217
280/743.1
2012/0074674 A1* 3/2012 Ohoka .................. B60R 21/203
345/1.3
2016/0075303 A1* 3/2016 Iida ..................... B60R 21/2338
280/729

FOREIGN PATENT DOCUMENTS

| | | | |
|---|---|---|---|
| JP | 6-312641 A | | 11/1994 |
| JP | 2000-38107 A | | 2/2000 |
| JP | 2003276546 A | * | 10/2003 |
| JP | 2006-76381 A | | 3/2006 |
| JP | 2007-76619 A | * | 3/2007 |
| JP | 2007-76619 A | | 3/2007 |
| JP | 3991739 B2 | | 10/2007 |
| JP | 2008-105521 A | | 5/2008 |
| JP | 2008-173994 A | | 7/2008 |
| JP | 2012-71687 A | | 4/2012 |
| JP | 2018-020737 A | | 2/2018 |
| JP | 2018020737 A | * | 2/2018 |
| JP | 2019-6306 A | | 1/2019 |
| WO | WO-2008113503 A1 | * | 9/2008 ....... B60R 21/21656 |

* cited by examiner

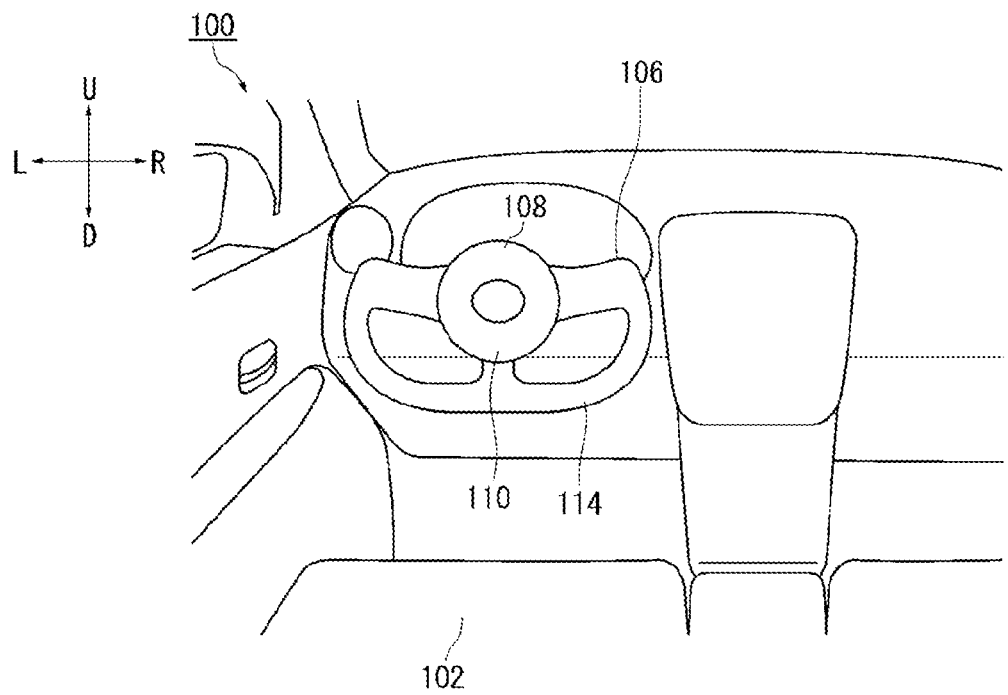
[FIG. 1A]
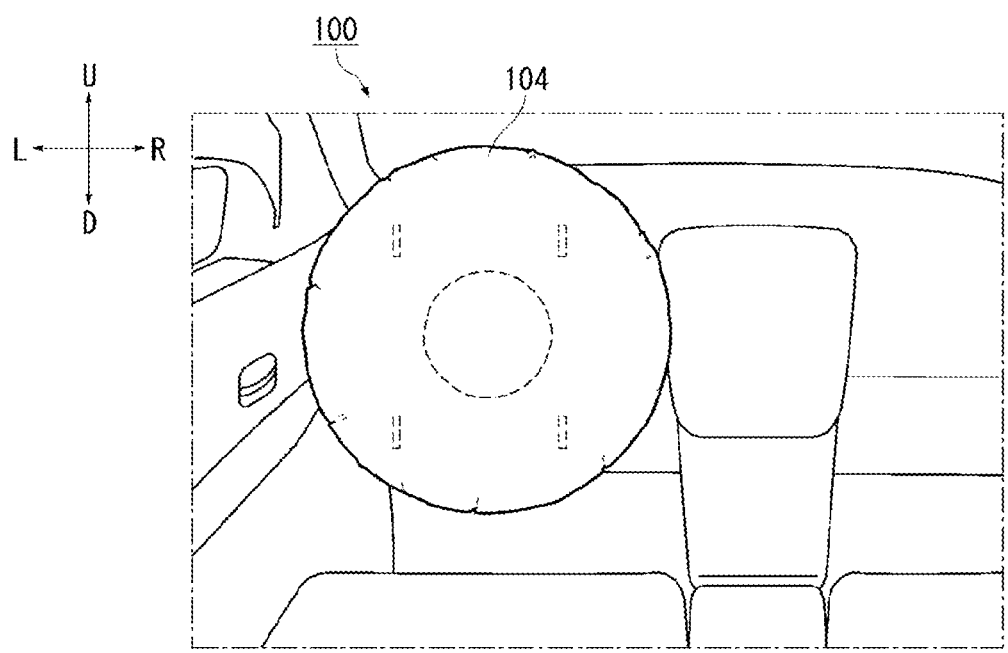
[FIG. 1B]

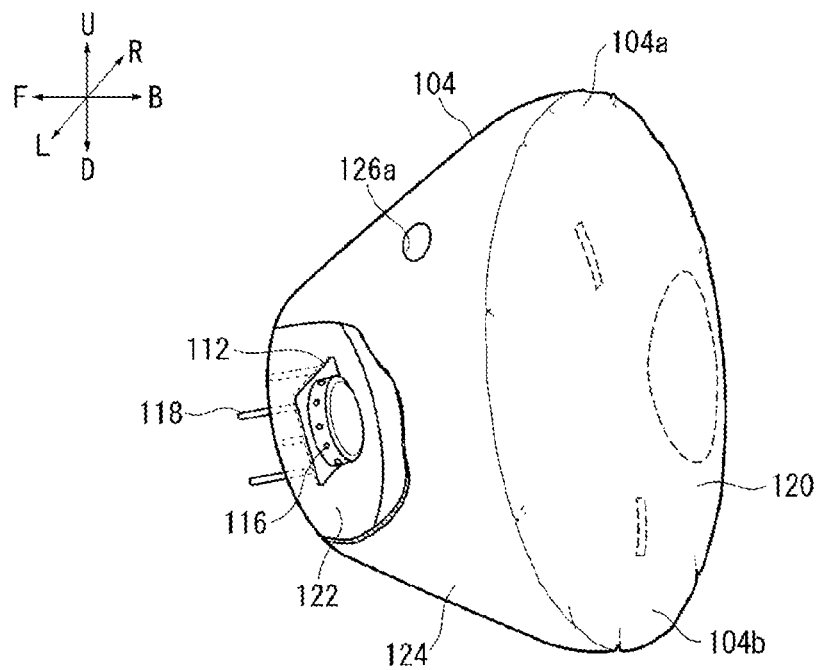
[FIG. 2A]
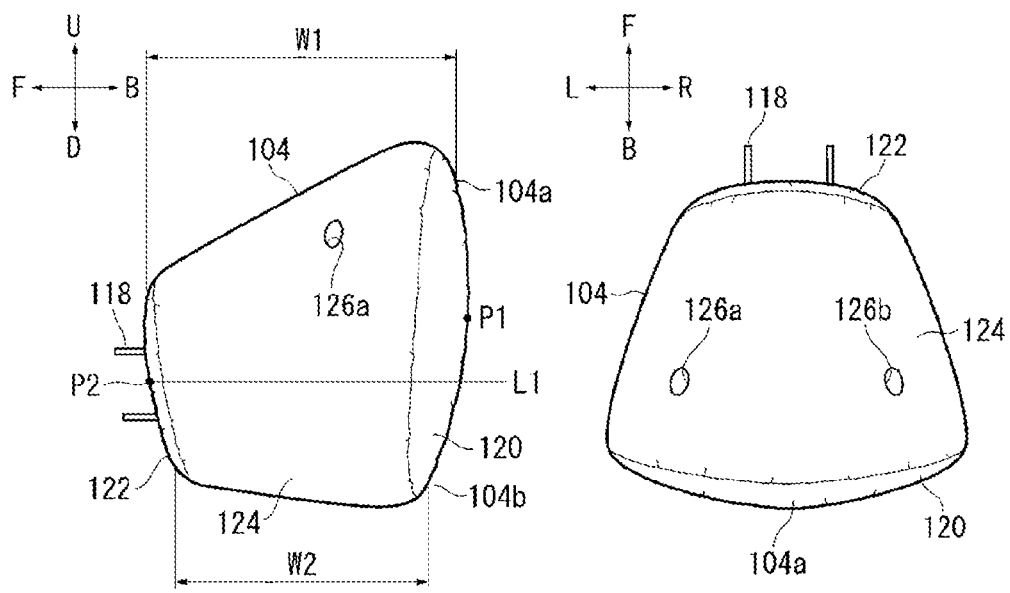
[FIG. 2B]   [FIG. 2C]

[FIG. 3]
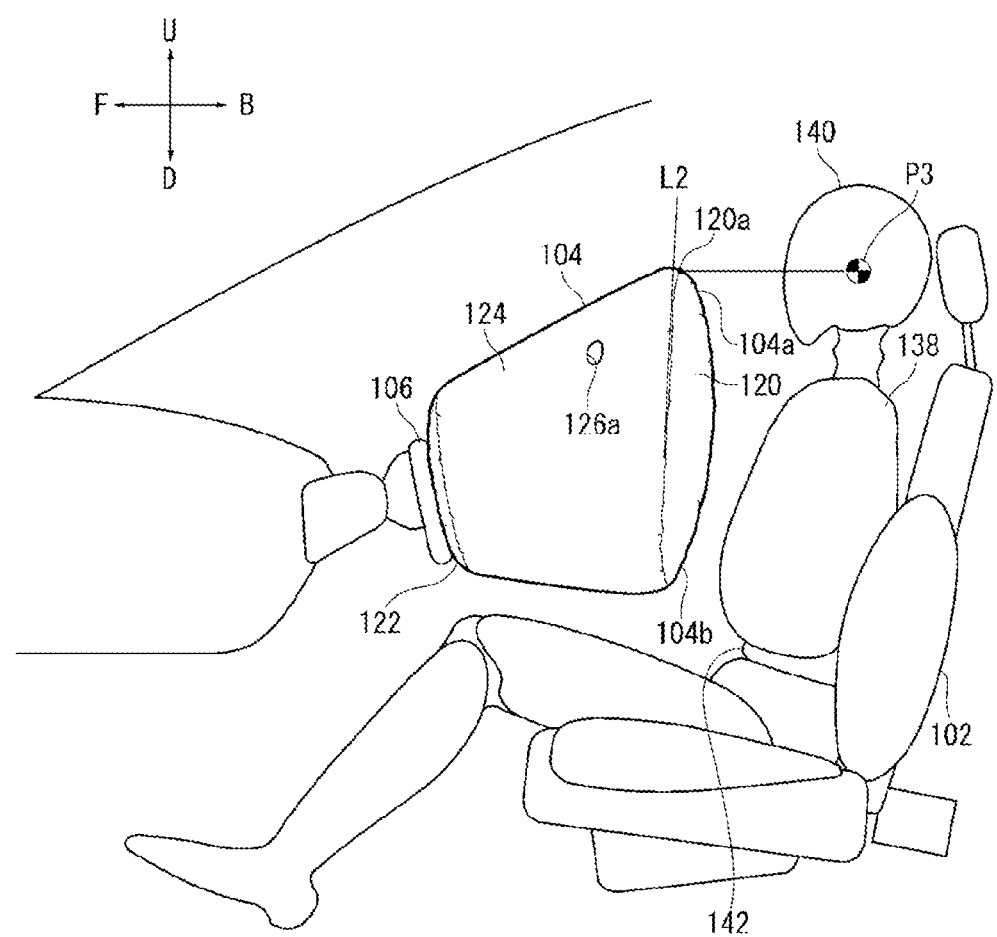

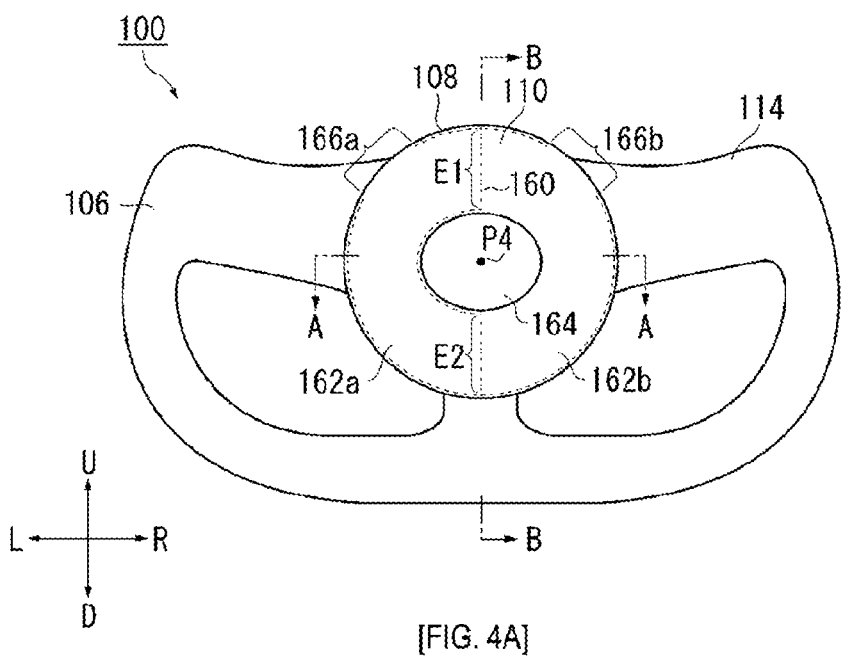
[FIG. 4A]
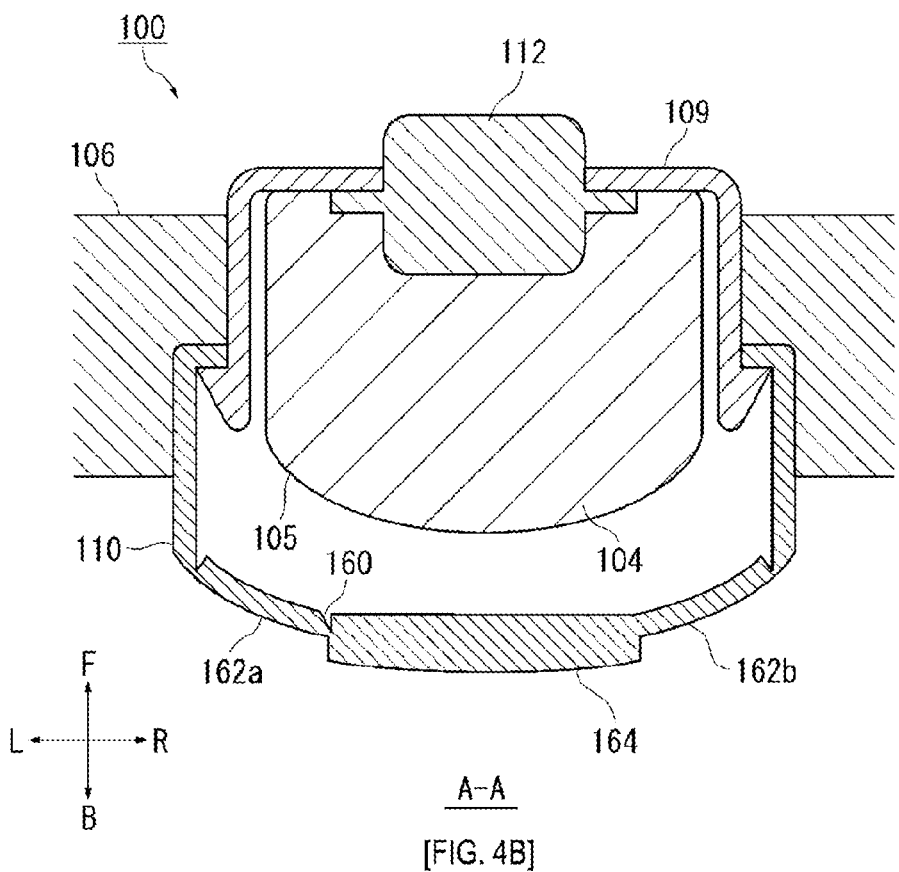
A-A
[FIG. 4B]

[FIG. 5]
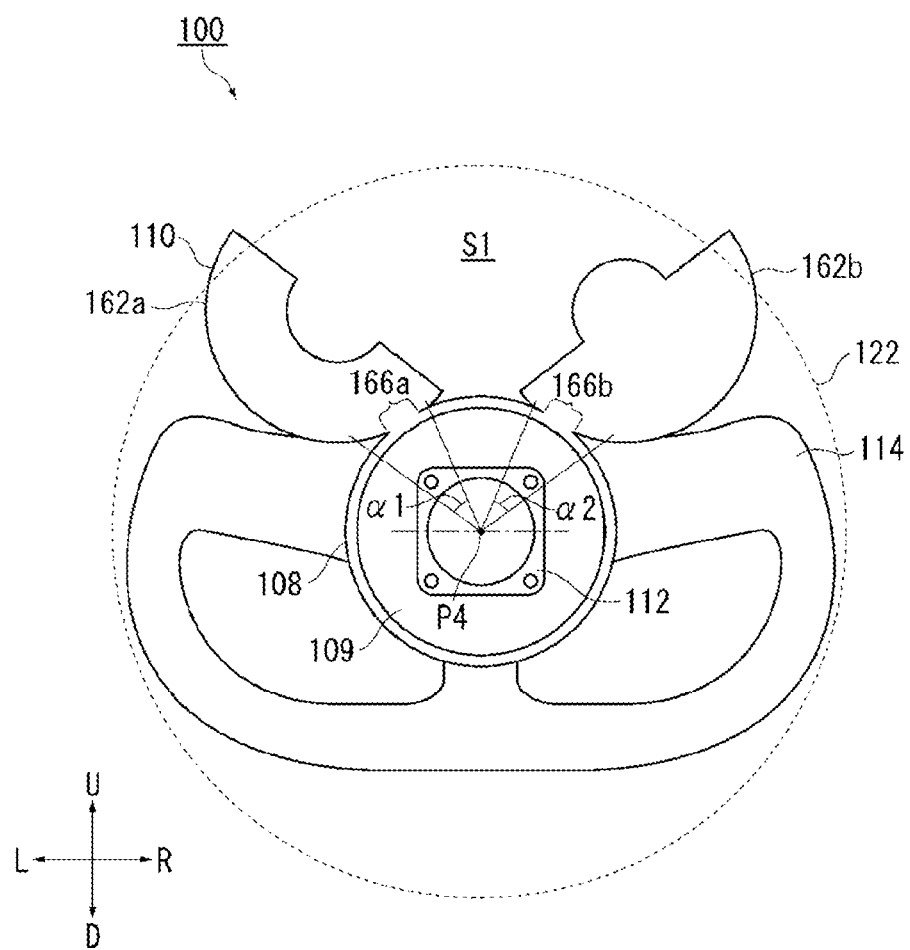

[FIG. 6]
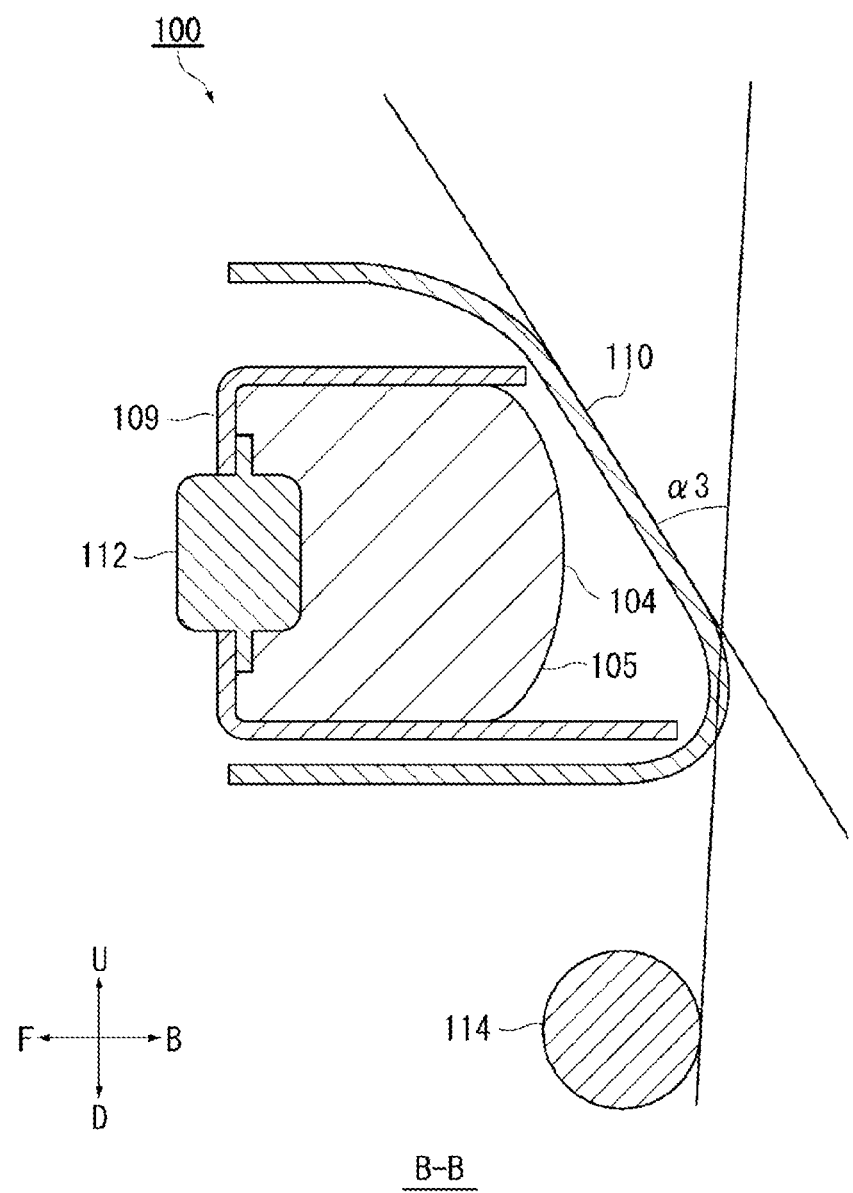

[FIG. 7A]
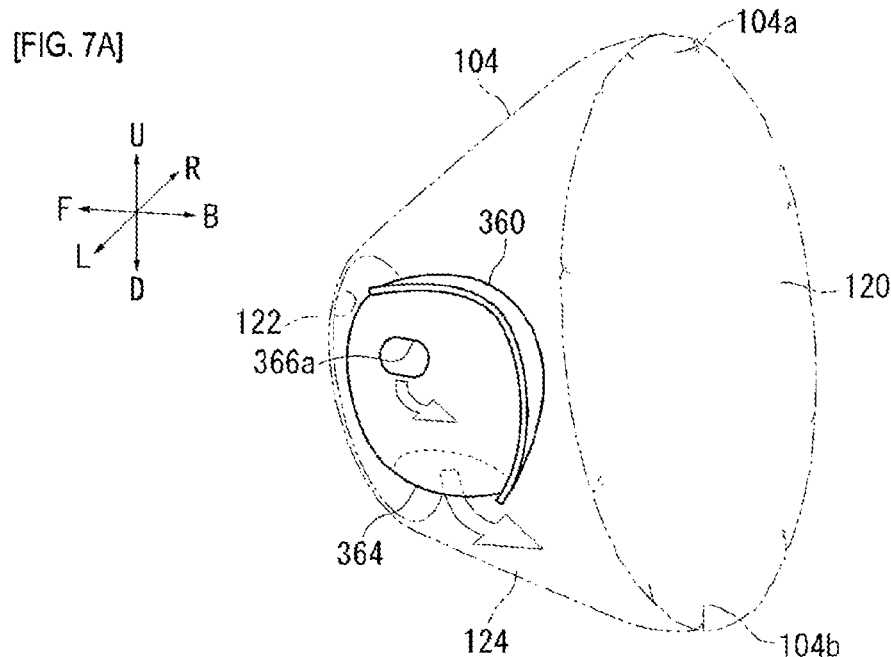
[FIG. 7B]
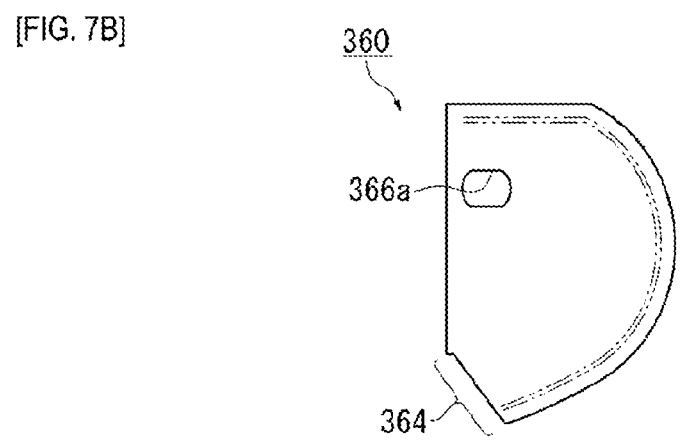
[FIG. 7C]
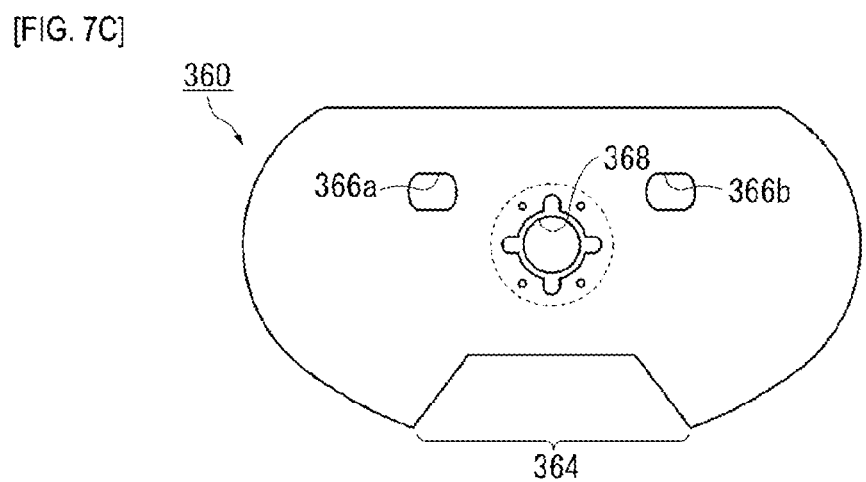

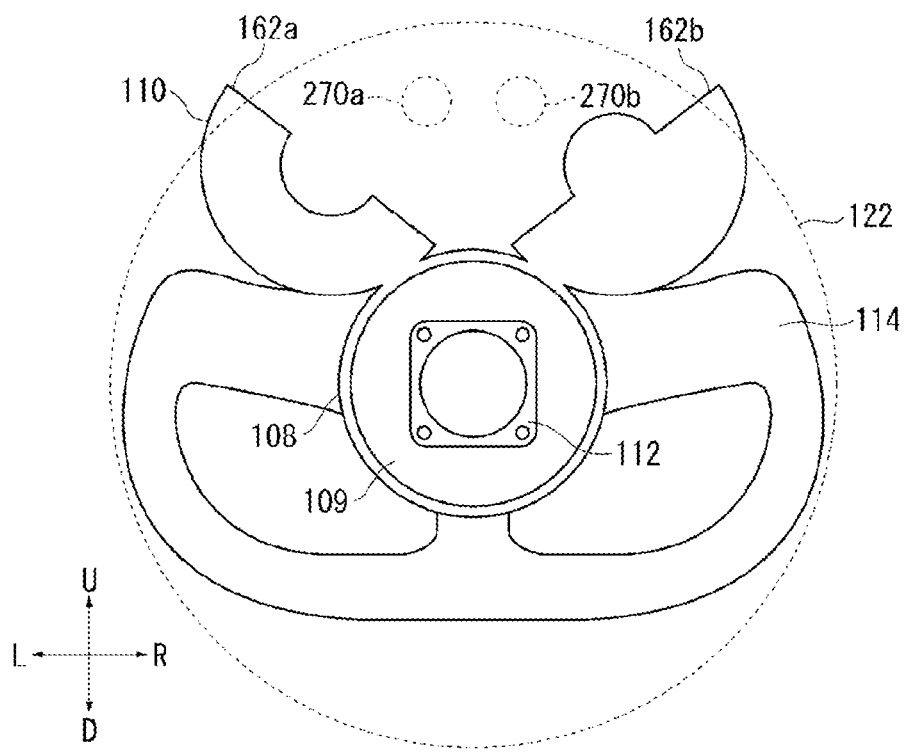
[FIG. 8A]
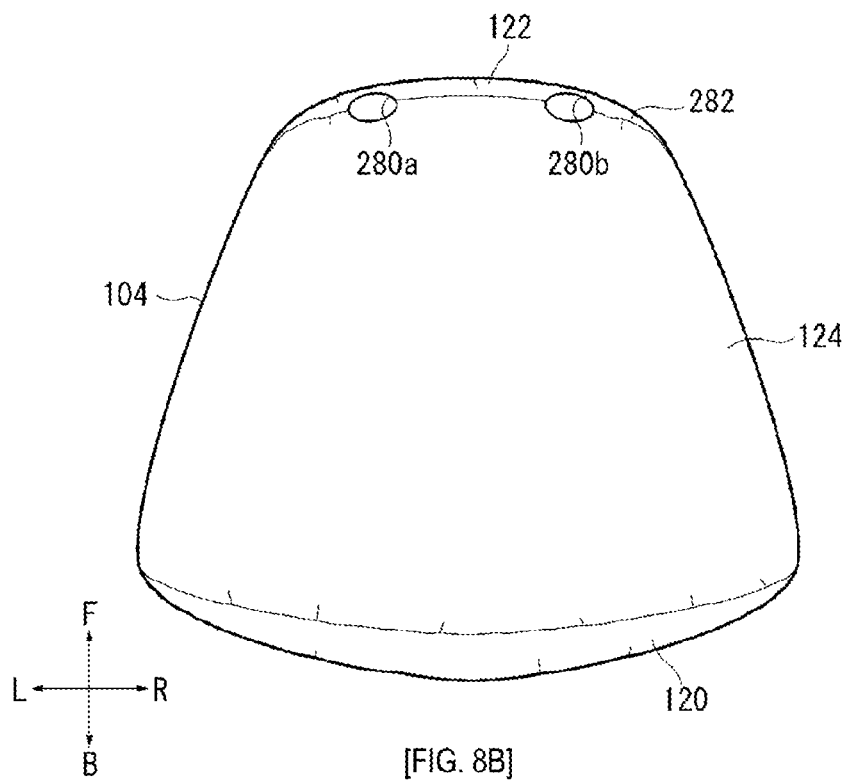
[FIG. 8B]

AIRBAG DEVICE FOR DRIVER'S SEAT

TECHNICAL FIELD

The present invention is related to a driver seat airbag apparatus for restraining a passenger in the event of an emergency.

BACKGROUND ART

Currently, essentially all vehicle steering wheels are equipped with a driver seat airbag apparatus. The airbag cushion of the driver seat airbag apparatus is primarily stored in the central hub of the steering wheel and cleaves a resin cover, and the like, at the expansion pressure so as to expand and deploy toward the front of a passenger. Normally, the steering wheel is in a position such that the upper side is inclined toward the front of the vehicle. For example, an airbag 1 of Patent Document 1 is configured such that the front surface 1f (passenger restraining surface) is vertical even when expanded and deployed from an inclined steering wheel by increasing the thickness of the upper portion in the vehicle front-rear direction.

PRIOR ART DOCUMENTS

Patent Documents

Patent Document 1: Japanese Patent Publication 3991739

SUMMARY OF THE INVENTION

In recent years, new steering wheels that transmit steering force to the wheels via an electrical signal are being developed, and steering wheel designs are therefore becoming more diverse. In particular, new electrically connected steering wheels do not need to be significantly rotated, unlike conventional steering wheels which physically transmit steering force via a steering shaft. Specifically, the rim of new steering wheels does not need to be a circular ring because the grip does not need to be rotated more than 180° while being held by the left and right hands like conventional rims. Therefore, new steering wheels can adopt an irregular design other than a circular shape, such as rims present on only the left and right sides with regard to a central hub, with the hub approaching the upper portion to give a flat shape (hereinafter, a steering wheel with a rim other than a circular shape is referred to as an "irregular steering wheel").

When the cover of the hub of the steering wheel is cleaved, expanded, and deployed, ordinary airbag cushions may also have configurations devised for the cover when cleaved, in order to be implemented in combination with an irregular steering wheel. For example, irregular steering wheels often have no structures such as rims on the upper side of the hub. In this case, if the cover is cleaved directly above, there are no other structures therearound, potentially allowing contact between the cleaved portion of the cover and the passenger. In addition, it is also necessary to prevent the cleaved portion of the cover from contacting the rim or switches.

Moreover, in the case of the airbag 1 disclosed in the abovementioned Patent Document 1, the rear panel 7 has a larger diameter than that of the front panel 8, allowing the reaction force to be efficiently received from the steering wheel 4. However, irregular steering wheels described above have a smaller size and a more biased shape than conventional circular steering wheels, reducing the contact range with the airbag cushion and potentially causing the deployment movement and deployed position of the airbag cushion to be unstable.

Problem to be Solved by the Invention

In view of the foregoing problems, an object of the present invention is to provide a driver seat airbag apparatus capable of fully restraining a passenger in terms of safety during expansion and deployment.

Means for Solving the Problems

In order to solve the abovementioned problems, an exemplary configuration of the driver seat airbag apparatus according to the present invention includes the steering wheel of a vehicle, and an airbag module including an inflator and an airbag cushion, the airbag module being housed in the steering wheel. Herein, the steering wheel includes a central hub, and a rim which is gripped by the passenger. The rim has a shape in which a portion of the upper portion of the rim is omitted or the portion located above the hub is closer to the hub side compared to portions located on the left and right sides of the hub. The hub includes a module housing part which houses the airbag module, and a cover which covers the module housing part and is cleavable at the expansion pressure of the airbag cushion. The cover includes multiple cover doors which open upon receipt of the expansion pressure of the airbag cushion, and, with the cover cleaved, the multiple cover doors are open in each of the right and left diagonal upward directions when viewed from the center of the hub, while a space portion without the cover doors is formed in the direction directly above the center of the hub when viewed from the center of the hub.

Many of the new steering wheels that have been developed in recent years do not have a circular shape, as is conventional, and there are a variety of designs, such as providing rims only on the left and right sides of the hub and the shape in which the upper side of the hub in the rim is closer to the hub side, and the like. If a non-circular irregular steering wheel other than the one of circular shape opens the cover door directly above the hub, there may be no structure around the perimeter preventing contact between the cover door and the passenger. Thus, in the abovementioned configuration, the cover door is configured so as to open primarily diagonally upward to the left and right, rather than directly from the center of the hub. This configuration can prevent contact between the cover door and the passenger compared to when the cover door is opened directly above when the upper half of the passenger has moved so as to fall forward.

Moreover, with the abovementioned configuration, the cover door can be used as the support surface for the airbag cushion when the cover door is opened diagonally upward to the left and right of the hub with respect to an irregular steering wheel. In particular, the support of the cover door on the front upper side of the airbag cushion allows the airbag cushion to achieve a rearward downward movement to suitably restrain the passenger. Moreover, if the cover door is opened diagonally upward to the left and right, it is possible to prevent contact with the rim or switches present on the left and right or lower sides of the hub.

There may be at least two cover doors, with the two cover doors capable of bisecting the cover to the left and right. By opening the two cover doors diagonally upward to the left and right of the hub, contact between the cover door and the passenger, the rim, and the like can be suitably prevented.

The cover may include a groove which is cleavable at the expansion pressure of the airbag cushion and defines the shape of the multiple cover doors, along with a hinge which does not cleave between the end points of the grooves formed at respective locations separated from the center of the hub diagonally upward to the left and right. This configuration can suitably achieve a cover door which opens diagonally upward to the left and right of the hub.

The hinge must be provided within an angle range of 45°±15° with respect to the horizontal line passing through the center of the hub as an origin. If the cover door is opened by a hinge provided in this angle range, the head of the passenger or a structure such as a grip can be efficiently avoided.

The range of the groove on the lower side of the center of the hub may be carved deeper than the range of the upper side of the center of the hub. According to this configuration, the groove cleaves faster on the lower side than the upper side, thereby allowing the cover door to move diagonally upward to the left and right.

The range of the groove on the lower side of the center of the hub may be thinner than the range of the upper side of the center of the hub. According to this configuration as well, the groove cleaves faster on the lower side than the upper side, thereby allowing the cover door to move diagonally upward to the left and right.

The cover may have a shape in which the upper side is inclined toward the front of the vehicle relative to the lower side. Even with a cover of this configuration, when the cover door is opened diagonally upward to the left and right of the hub, the cover door can be used to support the front upper side of the airbag cushion and expand and deploy the airbag cushion rearward downward.

A portion of the inflator may be inserted into the airbag cushion. Herein, the portion may have a predetermined gas outlet formed therein, the driver seat airbag apparatus may further include a flow-regulating material provided in the airbag cushion and covering the portion of the inflator, and the flow-regulating material may include an opening below the portion of the inflator.

The flow-regulating material described above allows gas supplied from the inflator to flow downward from the opening part, thereby allowing the airbag cushion to expand from the lower portion side. Consequently, the airbag cushion can quickly come between the irregular steering wheel and the abdomen of the passenger. When the airbag cushion is sandwiched between the irregular steering wheel and the abdomen of the passenger, the posture of the airbag cushion is stable, thereby also improving the restraint performance of the airbag cushion on the head of the passenger.

The airbag cushion may include: a steering side panel located on the steering wheel side; a passenger side panel located on the passenger side; a side panel connecting the edge of the steering side panel to the edge of the passenger side panel so as to configure a side portion of the airbag cushion; and a first vent hole provided at respective locations of the side panels diagonally upward to the left and right with respect to the center of the hub and discharging gas. The first vent hole provided on the left and right upper diagonal sides of the side panel allows the gas to be discharged in a direction in which the passenger is not present.

The airbag cushion may include: a steering side panel located on the steering wheel side; a passenger side panel located on the passenger side; a side panel connecting the edge of the steering side panel to the edge of the passenger side panel to configure a side portion of the airbag cushion; and a second vent hole provided at locations of the steering side panels (at which the steering wheel does not overlap the multiple cover doors) and discharging gas. The second vent hole can also discharge the gas in a direction in which the passenger is not present.

The airbag cushion may include: a steering side panel located on the steering wheel side; a passenger side panel located on the passenger side; a side panel connecting the edge of the steering side panel to the edge of the passenger side panel to configure a side portion of the airbag cushion; and a third vent hole provided in a condition such that respective locations of the boundary between the side panel and the steering side panel which are provided diagonally upward to the left and right with respect to the center of the hub are opened and discharging gas. The third vent hole can also discharge the gas in a direction in which the passenger is not present.

Effect of the Invention

The present invention enables the provision of a driver seat airbag apparatus capable of fully restraining a passenger in terms of safety during expansion and deployment.

BRIEF DESCRIPTION OF THE DRAWINGS

FIGS. 1A and 1B illustrate a driver seat airbag apparatus according to an embodiment of the present invention. FIG. 1A is a view illustrating a vehicle prior to operation of a driver seat airbag apparatus 100. FIG. 1B is a diagram illustrating a vehicle after a cushion 104 of the driver seat airbag apparatus 100 expands and deploys.

FIGS. 2A-2C illustrate the cushion in FIG. 1B during expansion and deployment. FIG. 2A is an upper perspective view of the cushion 104 of FIG. 1B. FIG. 2B is a side view of the cushion 104 of FIG. 1B. FIG. 2C is an upper view of the cushion 104 of FIG. 1B.

FIG. 3 is a diagram illustrating the cushion in FIG. 2(*b*) and a passenger seated in a seat.

FIGS. 4A and 4B illustrate the irregular steering wheel of FIG. 1A. FIG. 4A is an enlarged view of the irregular steering wheel of FIG. 1A. FIG. 4B is a cross-sectional view along A-A of FIG. 4A.

FIG. 5 is a diagram illustrating the state when the cover of FIG. 4(*a*) cleaves.

FIG. 6 is a cross sectional view taken along B-B of the irregular steering wheel of FIG. 4(*a*).

FIGS. 7A-7C illustrate a modified example of an internal structure of the cushion in FIG. 2A. FIG. 7A illustrates the internal structure through each panel of the cushion of FIG. 2A. FIG. 7B is a side view of the flow-regulating material in FIG. 7A. FIG. 7C illustrates the flow-regulating material of FIG. 7B when unstitched and spread out on a plane.

FIGS. 8A and 8B illustrate modified examples of the vent hole in FIG. 2C. FIG. 8A illustrates a first modified example of the vent holes of FIG. 2C. FIG. 8B illustrates a second modified example of the vent holes of FIG. 2C.

100 . . . Driver seat airbag apparatus, 102 . . . Seat, 104 . . . Cushion, 104*a* . . . Upper portion of the cushion, 104*b* . . . Lower portion of the cushion, 106 . . . Irregular steering wheel, 108 . . . Hub, 110 . . . Cover, 112 . . . Inflator, 116 . . . Gas outlet, 118 . . . Stud bolt, 120 . . . Passenger side panel, 120*a* . . . Upper end of the passenger side panel, 122 . . . Steering side panel, 124 . . . Side panel, 126*a*, 126*b* . . . First vent hole, 138 . . . Passenger, 140 . . . Head, 142 . . . Abdomen, 160 . . . Groove, 162a, 162b . . . Left and right cover doors, 164 . . . Emblem, 166a, 166b . . . Left and right hinges, 270a, 270b . . . Second vent hole, 280a, 280b . . . Third vent hole, 360 . . . Flow-regulating material, 364 . . . Opening, 366a, 366b . . . Exhaust ports, 368 . . . Insertion port, L1 . . . Virtual line extending from the center of the steering side panel, L2 . . . Boundary between the side panel and the passenger side panel, P1 . . . Center of the passenger side panel, P2 . . . Center in the height direction of the steering side panel, P3 . . . Center of gravity of the head, P4 . . . Center of the hub, S1 . . . Space, W1 . . . Width of the upper portion of the cushion, W2 . . . Width of the lower portion of the cushion

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating the outline of a driver seat airbag apparatus 100 according to an embodiment of the present invention. FIG. 1(a) is a view illustrating a vehicle prior to operation of the driver seat airbag apparatus 100. Hereinafter, regarding FIG. 1 and other diagrams, the vehicle front-rear direction are illustrated using the symbols F (Forward) and B (Back), the vehicle width direction of the vehicle using the symbols L (Left) and R (Right), and the vehicle up-down direction using the symbols U (Up) and D (Down).

The driver seat airbag apparatus 100 is applied in the present embodiment as an airbag for a driver seat airbag apparatus for a vehicle with the steering wheel on the left side (front row left side seat 102). Hereinafter, explanations are made assuming the front row left side seat 102, for example, the vehicle outer side in the vehicle width direction (hereinafter, the outer vehicle side) refers to the left side of the vehicle, while the vehicle inner side in the vehicle width direction (hereinafter, the vehicle inner side) refers to the right side of the vehicle. Furthermore, with regard to the present embodiment, the front direction is described as "front" while the back side direction is described as "rear" as viewed from a passenger normally seated in the seat 102. Similarly, the right hand direction of a normally seated passenger is described as "right" while the left hand direction is described as "left". Furthermore, with regard to the center of the passenger's body at this time, the direction toward the head is "up" while the direction toward the legs is "down."

An airbag cushion of a driver seat airbag apparatus (hereinafter, referred to as cushion 104 (see FIG. 1(b)) is stored in a condition folded, wound, or the like inside the central hub 108 of the steering wheel (irregular steering wheel 106 described later) in front of the seating position of the seat 102. The hub 108 is configured so as to include a module housing part 109 (which houses the cushion 104 and the inflator 112 (see FIG. 4 b) for supplying the gas), a cover 110, and the like. At this time, the cushion 104 is housed in the module housing part 109 by configuring the airbag module 105 together with the inflator 112.

The irregular steering wheel 106 on which the cushion 104 is installed in the present embodiment is assumed to be of a configuration such that operation by the passenger is converted into an electrical signal and transmitted to the wheel. The irregular steering wheel 106 has a rim 114 of a shape other than a circular ring and is a different shape from conventional steering wheels with a circular rim. The rim 114 is the portion gripped by the passenger and accepts the operation of rotating about the central hub 108; however, unlike conventional circular ring rims, since the operation involving rotating the grip at a large angle is not necessary, there is no need to hold the grip with the left or right hand. Therefore, the rim 114 is shaped to be present only on the left, right, and lower sides of the hub 108, wherein a portion of the upper portion of the rim 114 is omitted.

Note that the irregular steering wheel 106 is one example having a shape in which a portion of the upper side of the rim 114 is omitted. Other examples of the irregular steering 106 may include a shape in which the portion located above the hub is closer to the hub side compared to portions located on the left and right sides of the hub, or in which a rim (grip) is present only on the left and right sides of the hub.

FIG. 1(b) is a diagram illustrating a vehicle after the cushion 104 of the driver seat airbag apparatus 100 expands and deploys. The cushion 104 begins to expand while the cover 110 is cleaved open by gas from the inflator 112 (see FIG. 2(a)) and expands and deploys into a bag shape in front of the seating position of the seat 102 in order to restrain the upper body and head of the passenger from moving forward. The cushion 104 has a circular shape as viewed from the seating position side and is formed by overlaying a plurality of panels that form the surface thereof and then stitching or adhering them.

FIG. 2 is a diagram illustrating a cushion 104 in FIG. 1(b) from each direction during expansion and deployment. FIG. 2(a) illustrates the cushion 104 in FIG. 1(b) seen from slightly above the vehicle outer side. In FIG. 2(a), a portion of the panel configuring the cushion 104 is cut out to expose the internal inflator 112.

The cushion 104 in the present embodiment has, as a characteristic shape, a shape similar to a truncated cone with the diameter widening from the irregular steering wheel 106 side (see FIG. 1(a)) toward the passenger side (vehicle rear side).

FIG. 2(b) is a diagram illustrating the cushion 104 of FIG. 2(a) from the left side in the vehicle width direction. The cushion 104 is formed from a plurality of panels and contains: a passenger side panel 120 (positioned in front as viewed from the passenger and thus also referred to as a front panel) positioned on the passenger side; a steering side panel 122 (positioned behind as viewed from the passenger and thus also referred to as a rear panel) positioned on the irregular steering wheel 106 side (see FIG. 1(a)); and a side panel 124 connecting the passenger side panel 120 and the steering side panel 122 to configure the side portion of the cushion 104.

The passenger side panel 120 is circular and serves as a passenger restraining surface that restrains the passenger during expansion and deployment of the cushion 104. The steering side panel 122 is circular and serves as a reaction surface that receives the reaction force from the irregular steering wheel 106 (see FIG. 1(a)) during expansion and deployment of the cushion 104 (see FIG. 1(b)). The side panel 124 is joined to the entire circumference of the edge of the steering side panel 122 and the entire circumference of the edge of the passenger side panel 120.

In the cushion 104, the side panel 124 is completely interposed between the passenger side panel 120 and the steering side panel 122, with no points existing in which the steering side panel 122 and the passenger side panel 120 are directly stitched together. Furthermore, no locations are present in the cushion 104 in which a total of three panels overlap and are simultaneously stitched together. These configurations enable efficient stitching and manufacturing of the cushion 104 into a bag shape.

The cushion 104 expands and develops into a shape of a truncated cone spreading toward the passenger side, such that the steering side panel 122 has a narrower area than the passenger side panel 120. A portion of the inflator 112 is inserted in the center of the steering side panel 122, while the stud bolt 118 provided in the inflator 112 penetrates and is fixed to the inside of the hub 108.

The inflator 112 is an apparatus for supplying gas and, in the present example, a disk type is used. The inflator 112, in which a portion thereof formed with a gas outlet 116 is inserted into the cushion 104 through the steering side panel 122, is activated based on an impact detection signal transmitted from a sensor not illustrated in the drawings to supply gas to the cushion 104. The inflator 112 is provided with a plurality of stud bolts 118. The stud bolts 118 pass through the steering side panel 122 of the cushion 104 in order to fasten to the interior of the hub 108 of the irregular steering wheel 106 (see FIG. 1(a)) described above. The cushion 104 is also secured to the interior of the hub 108 by the fastening the stud bolts 118.

Note that examples of currently prevailing inflators include: types filled with a gas generating agent and which burn the agent to generate a gas; types filled with a compressed gas and which supply the gas without generating heat; hybrid types that utilize both a combustion gas and a compressed gas; and the like. Any of these types of inflators can be used as the inflator 112.

The expanded and deployed cushion 104 is shaped along a truncated cone and is generally slightly inclined. Specifically, the shape is inclined such that the center P1 of the passenger side panel 120 in the height direction is positioned above an imaginary line L1 horizontally extending from the center P2 of the steering side panel 122 in the height direction. Furthermore, when the cushion 104 is expanded and deployed, the passenger side panel 120 is disposed so as to extend essentially vertically, while the steering side panel 122 is disposed in an inclined manner such that the upper part leans toward the vehicle front side (left side in FIG. 2(b)). As a result, in the vehicle front-rear direction, the width W1 of the upper portion 104a of the expanded and deployed airbag cushion 104 is thicker than the width W2 of the lower portion 104b of the airbag cushion 104.

FIG. 2(c) is a diagram illustrating the cushion 104 of FIG. 2(a) from above. The cushion 104 is in the shape of an essentially symmetrical truncated cone when viewed from above. Two first vent holes 126a, 126b that discharge gas are provided in the side panel 124. Vent holes 126a, 126b are provided on the upper side of the side panel 124 at two locations on the left and right sides. The vent holes 126a, 126b provided in these positions allow gas to be vented in a direction in which the passenger is not present during expansion and deployment of the cushion 104.

FIG. 3 is a diagram illustrating the cushion 104 in FIG. 2(b) and a passenger 138 seated in a seat 102. FIG. 3 illustrates the cushion 104 and the passenger 138 as viewed from the left side in the vehicle width direction.

In the present example, as described with reference to FIG. 2(b), the upper portion 104a of the expanded and deployed cushion 104 is configured so as to be thicker in the vehicle front-rear direction than the lower portion 104b of the cushion 104. In particular, the expanded and deployed cushion 104 is installed in this shape such that the boundary L2 between the side panel 124 and the passenger side panel 120 extends upward when viewed from the vehicle width direction. In the event of an emergency, a passenger 138 attempting to move forward in the vehicle will make contact at an early stage from the upper portion 104a of the cushion 104. The upper portion 104a of the cushion 104 absorbs the load from the head 140 of the passenger 138 with the thickness thereof.

As described with reference to FIG. 2(b), the width W2 in the vehicle front-rear direction of the lower portion 104b of the cushion 104 is slightly smaller than the width W1 of the upper portion 104a. In general vehicles, the steering wheel is inclined at an angle of approximately 20° to 25° to the vehicle front side, with the space between the steering wheel and the passenger 138 narrowing in the vehicle front-rear direction toward the lower abdomen 142 side. With the cushion 104 of the present example, the width in the vehicle front-rear direction decreases as the cushion moves toward the lower portion 104b, thereby allowing the lower portion 104b to easily enter the narrow space between the irregular steering wheel 106 and the abdomen 142.

According to the configuration described above, the lower portion 104b of the cushion 104 is sandwiched by the irregular steering wheel 106 and the abdomen 142, making the shape of the cushion 104 less likely to collapse. Furthermore, the restraining performance of the upper portion 104a of the cushion 104 with regard to the head 140 of the passenger 138 is also improved as a result. In particular, the stabilized shape of the cushion 104 can prevent movement of the head 140 of the passenger 138, such as forward bending, backward bending, or the like of the head 140, which are prone to high injury values.

As described above, the cushion 104 of the present example is configured so as to have a wide area of the passenger side panel 120 serving as a passenger restraining surface and a narrow area of the steering side panel 122, which receives the reaction force from the irregular steering wheel 106. The irregular steering wheel 106 has a narrower contact range with the airbag cushion than conventional circular steering wheels. The steering side panel 122 can be set to dimensions based on the irregular steering wheel 106 so as to omit portions that do not contact the irregular steering wheel 106. This allows the amount of material used to construct the steering side panel 122 to be reduced and the gas capacity of the cushion 104 to be reduced, thereby contributing to cost reduction.

The cushion 104 of the present embodiment can be set so as to have a gas capacity within a range of 50 liters to 60 liters by using a steering side panel 122 with a small diameter. This reduces the number of panels configuring the cushion 104. Therefore, the cushion 104 can be folded or the like into a smaller storing form, allowing it to be easily installed on an irregular steering wheel 106 with limited storing space.

A gas capacity within the aforementioned range eliminates the need for a high output inflator and allows an inflator 112 (see FIG. 2(a)) to be used which is as small and inexpensive as possible. For example, the inflator 112 can use an output within a range of 200 kPa to 230 kPa. An inflator with this output is small and inexpensive, making it beneficial in terms of weight reduction and cost reduction.

Reducing the gas capacity of the cushion 104 shortens the time required for the expansion of the cushion 104 to be completed, leading to improvement of the passenger restraining performance.

In the present embodiment, the upper end 120a of the passenger side panel 120 of the expanded and deployed cushion 104 is set so as to be positioned at a height within a range of ±100 mm of the center of gravity of the head of an adult male. For example, the passenger 138 in FIG. 3 is assumed to be a test dummy AM50 that mimics a physique conforming to 50% of average U.S. adult males (50th percentile male equivalent, 175 cm tall and 78 kg in weight). The upper end 120a of the passenger side panel 120 of the cushion 104 is set so as to be positioned at a height within a range of ±100 mm of the center of gravity P3 of the head of the AM50.

The head 140 of the passenger 138 may cause rotational movement such as forward bending, backward bending, or the like when contacting the passenger side panel 120 from the chin, forehead, or the like. As described above, forward and backward bending of the head 140 are likely to cause high injury values due to the structure of the human body. The cushion 104 of the present embodiment contacts the passenger side panel 120 from the position of the center of gravity P3 of the head to restrain the head 140 without excess movement, thereby enabling the injury value to be reduced.

FIG. 4 is a diagram illustrating the irregular steering wheel of FIG. 1(a) from each direction. FIG. 4(a) is an enlarged view of the irregular steering wheel 106 of FIG. 1(a). In the present embodiment, the cover 110 of the hub 108 is devised in terms of safety during expansion and deployment of the cushion 104 (see FIG. 3) and further improving the passenger restraining performance.

In the following description, a representation such as the upper side of the hub 108 appears in the vertical and lateral directions with respect to the irregular steering wheel 106. In this case, the upper side of the hub 108 refers to the upper side of the straight line connecting the 3 o'clock and 9 o'clock positions when the irregular steering wheel 106 is regarded as a clock, with the clock needle axis at the center of the hub 108. The upper portion of the irregular steering wheel 106 may be installed so as to be inclined toward the front side of the vehicle. As a result, the vertical direction of the irregular steering wheel 106 is the direction connecting the 12 o'clock and 6 o'clock positions (when the irregular steering wheel 106 is regarded as a clock) and may not coincide with the actual vertical direction. Moreover, the lateral direction of the irregular steering wheel 106 is the direction of 3 o'clock or 9 o'clock when the irregular steering wheel 106 is regarded as a clock.

FIG. 4(b) is a cross sectional view taken along A-A of the hub 108 of the irregular steering wheel 106 of FIG. 4(a). As illustrated in FIG. 4(b), the hub 108 is configured so as to include: a module housing part 109 which houses the airbag module 105; and a cover 110 which covers the module housing part 109. The cover 110 is cleavable at the expansion pressure of the cushion 104. As a result, a groove 160 which induces cleavage is carved on the surface on the module housing part 109 side of the cover 110.

FIG. 4(a) is again referred to. The cover 110 is configured so as to form multiple cover doors 162a, 162b when cleaved, with the groove 160 defining the shape of the cover door 162a. In the present embodiment, two cover doors 162a and 162b are configured so as to form the cover 110. The cover doors 162a, 162b are formed so as to bisect the cover 110 to the left and right such that the right cover door 162a includes an emblem 164. Moreover, hinges 166a and 166b which connect the main body of the cover 110 to the cover doors 162a, 162b are formed on the cover 110 so that the cover door 162a does not scatter.

FIG. 5 is a diagram illustrating the state when the cover 110 in FIG. 4(a) cleaves. FIG. 5 illustrates the vicinity of the hub 108 of the irregular steering wheel 106 through the steering side panel 122 of the cushion 104. When the groove 160 (see FIG. 4(a)) is cleaved at the expansion pressure of the cushion 104, the cover 110 according to the present embodiment opens the two cover doors 162a, 162b respectively diagonally upward to the left and right as viewed from the center P4 of the hub 108.

The hinges 166a, 166b are formed at respective locations separated from the center P4 of the hub 108 diagonally upward to the left and right as regions which do not cleave between end points of the groove 160. In addition, the hinges 166a, 166b are provided within an angle range of 45°±15° with respect to the horizontal line passing through the center P4 of the hub 108, that is, within angle ranges of α1 and α2 between 30° and 60°. When the irregular steering wheel 106 is regarded as a clock by the hinges 166a, 166b of this configuration, the left cover door 162a opens in the direction of the range between 10 o'clock and 11 o'clock, while the right cover door 162b opens in the direction of the range between 1 o'clock and 2 o'clock.

As represented by the irregular steering wheel 106, new steering wheels that have been developed in recent years are often not circular as is conventional. For example, there are a variety of designs, such as providing rims only on the left and right sides of the hub and the shape in which the upper side of the hub in the rim is closer to the hub side, and the like. If the non-circular irregular steering wheel 106 other than the one of circular shape opens the cover door directly above the hub 108, there may be no structure around the perimeter preventing contact between the cover door and the passenger. Specifically, when the irregular steering wheel 106 is regarded as a clock, the rim may be omitted or the rim may be in a design closer to the hub, within a range above the straight line connecting the 3 o'clock and 9 o'clock positions passing through the center of the hub 108.

Therefore, in the present embodiment, a configuration in which the cover doors 162a, 162b open diagonally above the left and right sides is achieved. That is, the present embodiment does not include a cover door which opens directly above (in the direction of 12 o'clock) when viewed from the middle P4 of the hub 108. The cover doors 162a, 162b which are opened diagonally upward to the left and right can prevent contact with the passenger 138 when the upper half of the passenger 138 (see FIG. 3) has moved to fall forward in the event of a vehicle emergency, compared to the cover door opened directly above.

In particular, the irregular steering wheel 106 does not have a rim 114 on the upper side (12 o'clock side) of the hub 108 compared to a conventional circular steering wheel, such that the passenger 138 (see FIG. 3) easily rides on the front of the vehicle. For example, the head 140 of the passenger 138 may be located on the upper side of the hub 108. When the passenger 138 is in a non-regular seating position (typically out-of-position) with respect to the seat 102, such as the passenger 138 riding out of the seat 102, and the cover door is opened directly above, the possibility of contact between the head 140 of the passenger 138 and the cover door increases more. Even in the case of such an out-of-position, in the present embodiment, the cover doors 162a, 162b open diagonally upward to the left and right with the cover 110 cleaved, such that the space S1 without the cover doors 162a, 162b is formed directly above when viewed from the center P4 of the hub 108. That is, in the present embodiment, the cover doors 162a, 162b open to the left and right so as to form the space S1, so that the possibility of contact between the cover 110 and the head 140 can be reduced.

If the cover doors 162a, 162b according to the present embodiment are opened diagonally upward to the left and right, it is possible to prevent contact with the rim 114 or switches present on the left and right or lower sides of the hub 108. By reducing the potential for the cover doors 162a, 162b to contact a structure such as a rim, the cover doors 162a, 162b can be prevented from falling off by impact, or the like, allowing the safety to be further increased.

Moreover, the cover door 162a which opens diagonally upward to the left and right with respect to the irregular steering wheel 106 can be used as the support surface of the cushion 104. The cover 110 is configured so as to be cleaved only by the groove 160 and move only at the hinges 166a and 166b, thereby ensuring a predetermined rigidity in the cover doors 162a, 162b. When the cover doors 162a, 162b can support the front upper side of the airbag cushion 104, the cushion 104 can cause a rearward downward movement. As described with reference to FIG. 3, expanding and deploying the cushion 104 rearward downward causes the cushion 104 to come between the irregular steering wheel 106 and the abdomen 142 of the passenger 138 and be sandwiched between the irregular steering wheel 106 and the abdomen 142 of the passenger 138, the posture of the cushion 104 is less likely to collapse, making it possible to improve the restraint performance of the cushion 104 with respect to the head 140 of the passenger 138. Moreover, in the case of rearward downward movement of the cushion 104, there is no risk of contacting the head 140 of the passenger 138 from below compared to rearward upward movement, so that the movement of the head 140, which is prone to high injury values, such as backward bending of the head 140 of the passenger 138 can be prevented. In particular, it is very effective to cause rearward downward movement in the cushion 104 because the cushion 104 is more likely to contact the head 140 of the passenger 138 from below in the out-of-position position described above.

FIG. 4(a) is again referred to. The range E2 of the groove on the lower side of the center P4 of the hub 108 may be carved deeper than the range of the upper side E1 of the center P4 of the hub 108. In other words, the range E2 of the groove on the lower side of the center P4 of the hub 108 may be thinner than the range E1 on the upper side of the center P4 of the hub 108. According to this configuration, the groove 160 can efficiently cause the cover doors 162a, 162b to move diagonally upward to the right and left, due to the fact that the range E2 on the lower side induces cleavage earlier than the range E1 on the upper side and makes the speed of cleavage fast.

As illustrated in FIG. 2(c), vent holes 126a, 126b are provided on upper sides of the left and right sides of the side panel 124. At this time, vent holes 126a, 126b may be provided at respective locations of the side panels 124 diagonally upward to the left and right with respect to the center P4 of the hub 108 (see FIG. 4(a)). These vent holes 126a, 126b can also discharge the gas in a direction in which the passenger is not present.

FIG. 6 is a cross sectional view taken along B-B of the irregular steering wheel 106 of FIG. 4(a). The cover 110 may have a shape in which the upper side is inclined toward the front of the vehicle relative to the lower side. For example, the cover 110 has a shape in which the design surface of the passenger side is inclined at an angle α3 toward the front of the vehicle with respect to the vertical line. Even with an irregular steering wheel 106 having a cover 110 with this configuration, reaction force is conventionally provided rearward upward to the cushion 104; in contrast, when the abovementioned cover doors 162a, 162b (see FIG. 5) are opened diagonally upward to the left and right of the hub 108, the cover doors 162a, 162b can be used to support the front upper side of the cushion 104, making it possible to expand and deploy the cushion 104 rearward downward.

As described above, the present embodiment can achieve a driver seat airbag apparatus 100 capable of fully restraining a passenger 138 (see FIG. 3) in terms of safety during expansion and deployment.

Modified Example

Modified examples of each Western style configuration described above will be described below. In FIGS. 7 to 8, the same components as those already described are omitted from the description by labeling them with the same symbols. Furthermore, in the following description, the same names as the components described above shall have the same functions unless otherwise indicated, even when labeled with a different symbol.

FIG. 7 is a diagram illustrating a modified example of the internal structure of the cushion 104 in FIG. 2(a). FIG. 7(a) illustrates the internal structure through each panel of the cushion 104 of FIG. 2(a). The cushion 104 is provided with a flow-regulating material 360 as a new internal structure.

The flow-regulating material 360 is a member that directs the gas of the inflator 112 (see FIG. 2(a)) in a specified direction and is connected to the steering side panel 122 inside the cushion 104, in a state covering the portion having the gas discharging port 116 of the inserted inflator 112. The flow-regulating material 360 has an opening portion 364 below the inflator 112 that discharges gas, along with small diameter exhaust ports 366a, 366b (see FIG. 7(c)) on side portions that also discharge gas.

FIG. 7(b) is a diagram illustrating the flow-regulating material 360 in FIG. 7(a) from the side. The flow-regulating material 360 is formed in a bag shape by stitching, with the lower side edge open to form an opening portion 364.

FIG. 7(c) illustrates a state in which the flow-regulating material 360 of FIG. 7(b) is unstitched and spread out on a plane. The flow-regulating material 360 is provided with an inserting port 368 into which a portion of the inflator 112 (see FIG. 2(a)) is inserted and is secured to the interior of the hub 108 (see FIG. 1(a)) along with the steering side panel 122 by the stud bolts 118 of the inflator 112. Exhaust ports 366a, 366b are provided at two locations on the left and right sides to supply gas in the vicinity of the center of the cushion 104. The opening portion 364 is formed so as to have a larger diameter than the exhaust ports 366a, 366b and allow more gas to pass through than the exhaust ports 366a, 366b.

With the flow-regulating material 360 described above, the gas supplied from the inflator 112 is preferentially supplied to the lower portion 104b of the cushion 104 (FIG. 7(a)) through the opening portion 364. This causes the cushion 104 to be preferentially expanded and deployed from the lower portion 104b side. According to this configuration, the cushion 104 allows the lower portion 104b to come between the irregular steering wheel 106 (see FIG. 4) and the abdomen 142 of the passenger 138 at an early stage and be sandwiched between the irregular steering wheel 106 and the abdomen 142.

FIG. 8 is a diagram illustrating a modified example of the vent hole in FIG. 2(c). FIG. 8(a) illustrates a first modified example of the vent holes of FIG. 2(c) (second vent holes 270a, 270b). Vent holes 270a, 270b are provided in the steering side panel 122. At this time, the vent holes 270a, 270b are provided in the steering side panel 122 at locations that do not contact the irregular steering wheel 106 (see FIG. 4 and the like), such that gas can be discharged in a direction in which the passenger 138 is not present. The vent holes 270a and 270b are provided at locations in the steering side panel 122 in which the irregular steering wheel 106 and the cover door 162 do not overlap. The vent holes 270a, 270b can also discharge the gas in a direction in which a passenger is not present.

FIG. 8(b) illustrates a second modified example of the vent holes 126a, 126b of FIG. 2(c) (third vent holes 280a, 280b). Vent holes 280a, 280b are formed by opening a portion of the boundary 282 between the side panel 124 and the steering side panel 122. The boundary between the side panel 124 and the steering side panel 122 is positioned at the vehicle front side, while the body of the passenger 138 (see FIG. 3) is not positioned in the periphery, particularly on the upper side. Therefore, the portion on the upper side of the boundary 282 between the side panel 124 and the steering side panel 122 is opened to form the vent holes 280a, 280b, allowing gas to be discharged in a direction in which the passenger 138 is not present.

The first vent holes 126a, 126b, second vent holes 270a, 270b and third vent holes 280a, 280b described above can be implemented simultaneously for one airbag cushion. The airbag cushion can implement each of these vent holes as appropriate, depending on the positional relationship with the passenger and the arrangement of any peripheral structures.

Preferred examples of the present invention have been described above while referring to the attached drawings. However, while the embodiments described above are preferred examples of the present invention, other embodiments can be implemented or performed by various methods. In particular, unless described otherwise in the specification of the present application, the invention is not limited to the shape, size, configurational disposition, and the like of parts illustrated in detail in the attached drawings. Furthermore, while expressions and terms used in the specification of the present application are used for providing a description, the invention is not limited thereto, unless specifically described otherwise.

Therefore, it is obvious that a person with ordinary skill in the art could conceive of various changed examples or modified examples within the scope described in the claims, which is understood to naturally belong to the technical scope of the present invention.

INDUSTRIAL APPLICABILITY

The present invention can be used as a driver seat airbag apparatus for restraining a passenger in the event of an emergency.

The invention claimed is:

1. A driver seat airbag apparatus, comprising:
a steering wheel of a vehicle; and
an airbag module including an inflator and an airbag cushion, the airbag module being housed in the steering wheel, wherein a portion of the inflator is inserted into the airbag cushion, the portion having a predetermined gas outlet formed therein;
a flow-regulating material provided in the airbag cushion and covering the portion of the inflator, the flow-regulating material comprising an opening below the portion of the inflator such that gas is preferentially supplied to a lower portion of the airbag cushion, the steering wheel comprising:
a rim configured to be gripped by a passenger, the rim having a shape in which a portion of an upper portion of the rim is omitted; and
a central hub comprising:
a module housing part which houses the airbag module; and
a cover which covers the module housing part, the cover comprising:
grooves which are cleavable at an expansion pressure of the airbag cushion and which define a shape of multiple cover doors which open upon receipt of the expansion pressure of the airbag cushion, wherein a range of the grooves on a lower side of a center of the hub is carved deeper than a range of the grooves on an upper side of the center of the hub;
a first hinge and a second hinge which do not cleave, the first hinge and the second hinge located between end points of the grooves and formed at respective locations separate from the hub diagonally upward to the left and right wherein, with the cover cleaved, the multiple cover doors are open in each of right and left diagonal upward directions when viewed from the center of the hub, and a space portion without multiple cover doors is formed between the first hinge and the second hinge directly above the center of the hub when viewed from the center of the hub such that the multiple cover doors do not contact each other.

2. The driver seat airbag apparatus according to claim 1, wherein there are at least two cover doors, with the two cover doors bisecting the cover to the left and right.

3. The driver seat airbag apparatus according to claim 1, wherein the first and second hinges are provided within an angle range of 45°±15° with respect to a horizontal line passing through the center of the hub as an origin.

4. The driver seat airbag apparatus according to claim 1, wherein the range of the grooves on the lower side of the center of the hub is thinner than the range of the grooves the upper side of the center of the hub.

5. The driver seat airbag apparatus according to claim 1, wherein the cover has a shape in which the upper side is inclined to the front of the vehicle relative to the lower side.

6. The driver seat airbag apparatus according to claim 1, wherein the airbag cushion comprises:
a steering side panel located on the steering wheel side;
a passenger side panel located on the passenger side;
a side panel connecting the edge of the steering side panel to the edge of the passenger side panel so as to configure a side portion of the airbag cushion; and,
vent holes provided at respective locations on the side panel diagonally upward to the left and right with respect to the center of the hub.

7. The driver seat airbag apparatus according to claim 1, wherein the airbag cushion comprises:
a steering side panel located on the steering wheel side;
a passenger side panel located on the passenger side;
a side panel connecting the edge of the steering side panel to the edge of the passenger side panel so as to configure a side portion of the airbag cushion; and,
a vent hole in the steering side panel.

8. The driver seat airbag apparatus according to claim 1, wherein the airbag cushion comprises:
- a steering side panel located on the steering wheel side;
- a passenger side panel located on the passenger side;
- a side panel connecting the edge of the steering side panel to the edge of the passenger side panel so as to configure a side portion of the airbag cushion; and,
- a first vent hole and a second vent hole provided in locations on a boundary between the side panel and the steering side panel, the first vent hole and the second vent hole provided diagonally upward to the left and right, respectively, with respect to a center of the steering side panel, wherein the first vent hole and the second vent hole are formed by opening a portion of the boundary between the side panel and the steering side panel.

* * * * *